(12) United States Patent
Barton et al.

(10) Patent No.: US 12,342,278 B2
(45) Date of Patent: Jun. 24, 2025

(54) AUTOMATED CONFIGURATION OF DEVICE WAKE SCHEDULES FOR SATELLITE COMMUNICATIONS

(71) Applicant: Cisco Technology, Inc., San Jose, CA (US)

(72) Inventors: Robert E. Barton, Richmond (CA); Francesco Basile, Pisa (IT); Michael Freed, Pleasanton, CA (US); Yen Chih Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 404 days.

(21) Appl. No.: 17/859,170

(22) Filed: Jul. 7, 2022

(65) Prior Publication Data

US 2024/0015647 A1    Jan. 11, 2024

(51) Int. Cl.
*H04W 52/02* (2009.01)
*H04W 72/30* (2023.01)

(52) U.S. Cl.
CPC ....... *H04W 52/0216* (2013.01); *H04W 72/30* (2023.01)

(58) Field of Classification Search
CPC . H04W 72/30; H04W 52/0216; H04W 72/23; H04W 84/06
USPC .................................. 370/311, 348; 455/427
See application file for complete search history.

(56) References Cited

U.S. PATENT DOCUMENTS

| | | | |
|---|---|---|---|
| 6,078,577 A * | 6/2000 | Bishop, Jr. ......... | H04B 7/18539 370/348 |
| 6,512,920 B1 * | 1/2003 | Yaoya ................ | H04B 7/18541 455/427 |
| 10,181,896 B1 | 1/2019 | Swift et al. | |
| 10,601,497 B2 | 3/2020 | Haley et al. | |
| 10,955,563 B2 | 3/2021 | Haley et al. | |
| 11,096,188 B1 * | 8/2021 | Vasisht ................ | H04W 72/12 |
| 11,184,287 B2 | 11/2021 | Engelen | |
| 2020/0280366 A1 * | 9/2020 | Bode ....................... | H04L 67/10 |
| 2021/0409142 A1 * | 12/2021 | Kim .................... | H04J 13/0051 |

(Continued)

FOREIGN PATENT DOCUMENTS

WO    2021001532 A1    1/2021

OTHER PUBLICATIONS

Samra, et al., "MAC Protocol Design Based on Satellites Presence for Low-Energy Wireless Sensor Networks", Wireless Personal Communications, Aug. 2015, 22 pages, Springer Science+Business Media.

(Continued)

*Primary Examiner* — David Q Nguyen
(74) *Attorney, Agent, or Firm* — INNOVATION GROUP LLC; James M. Behmke

(57) ABSTRACT

According to one or more embodiments of the disclosure, a first device in a network may obtain a satellite communication schedule indicative of when a satellite will be in communication range of the first device. The first device may communicate with the satellite according to the satellite communication schedule. The first device may receive a request for the satellite communication schedule from a second device in the network. The first device may send the satellite communication schedule to the second device, wherein the second device uses the satellite communication schedule to configure a wake schedule of the second device.

20 Claims, 9 Drawing Sheets

(56) References Cited

U.S. PATENT DOCUMENTS

| | | | |
|---|---|---|---|
| 2022/0046504 A1* | 2/2022 | Shrestha | H04W 36/06 |
| 2022/0141831 A1* | 5/2022 | Vasisht | H04W 72/12 |
| | | | 455/12.1 |
| 2022/0217658 A1* | 7/2022 | Ma | H04B 7/18513 |
| 2023/0261740 A1* | 8/2023 | Hirsch | H04B 7/18513 |
| | | | 370/316 |

OTHER PUBLICATIONS

Kota, et al., "Satellite 5G: IoT Use Case for Rural Areas Applications", SPACOMM 2019 : The Eleventh International Conference on Advances in Satellite and Space Communications, 2019, pp. 7-14, IARIA.

Cakaj, et al., "The Coverage Analysis for Low Earth Orbiting Satellites at Low Elevation", (IJACSA) International Journal of Advanced Computer Science and Applications, vol. 5, No. 6, 2014, pp. 6-10.

Khisa, et al., "Medium Access Control Protocols for the Internet of Things Based on Unmanned Aerial Vehicles: A Comparative Survey", Sensors 2020, 20, 5586, 41 pages, MDPI.

"Tracking and Data Relay Satellite System", online: https://en.wikipedia.org/wiki/Tracking_and_Data_Relay_Satellite_System, Jan. 17, 2022, accessed Jun. 15, 2022, 7 pages, Wikimedia Foundation, Inc.

"Find Starlink", online: htttps://findstarlink.com/, accessed Jun. 15, 2022, 1 page, SpaceX Starlink Satellites Tracker.

"Live Map of Satellite Positions", online: https://in-the-sky.org/satmap_worldmap.php, accessed Jun. 15, 2022, 3 pages, In-The-Sky.org.

Wang, et al., "A Joint Optimization Scheme for Hybrid MAC Layer in LEO Satellite Supported IoT", IEEE Internet of Things Journal, vol. 8, Issue 15, Aug. 1, 2021, 12 pages.

Wang, et al., "Dynamic Uplink Transmission Scheduling for Satellite Internet of Things Applications", China Communications, Oct. 2020, pp. 241-248.

Qu, et al., "LEO Satellite Constellation for Internet of Things", IEEE Access, vol. 5, 2017, pp. 18391-18401, IEEE.

* cited by examiner

AUTOMATED CONFIGURATION OF DEVICE WAKE SCHEDULES FOR SATELLITE COMMUNICATIONS

TECHNICAL FIELD

The present disclosure relates generally to automated configuration of device wake schedules for satellite communications.

BACKGROUND

Often, sensors on their own aren't very capable devices on their own. For example, due to cost considerations, portability considerations, form factor limitations, location limitations, power supply limitations, etc. constraints, sensors may have relatively limited resources to complete tasks and rely on communication with external devices to process the data they collect. The sensors may connect and exchange the data that they have collected with the external devices and systems over a communications network. In some examples, sensors may be remote from a permanent power supply and instead rely on a battery to supply power to collect and communicate the data. As such, especially in remote locations, power supply conservation may be a priority in sensor operation.

As such, most sensors spend most of their time sleeping, and only wake up when: 1) a critical event triggers the sensor (for example, the pressure on this pipeline has exceeded a certain threshold), or, (2) the sensor wakes up on at established frequency/schedule that is generally set by the application or by an administrator. The sensor typically stays asleep as much as possible to prolong its battery life (i.e., if the sensor were to transmit continually every time there is an event, the battery would drain quickly).

In some instances, a sensor may communicate its data over a satellite communication network, which is functionally different than communicating with an access point over the internet. For example, a satellite, unlike an access point in a fixed location, may only be within data communication range (e.g., flying over a sensor) to the sensor for limited windows of time. Thus, for a sensor to transmit data, the satellite must be in communication range. However, if the sensor were to stay awake continually, looking for the satellite to appear in order to send its communication, it's battery would be rapidly depleted. Conversely, if the sensor wakes up to communicate but cannot find a satellite within signal range, its data transmission will not be possible.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
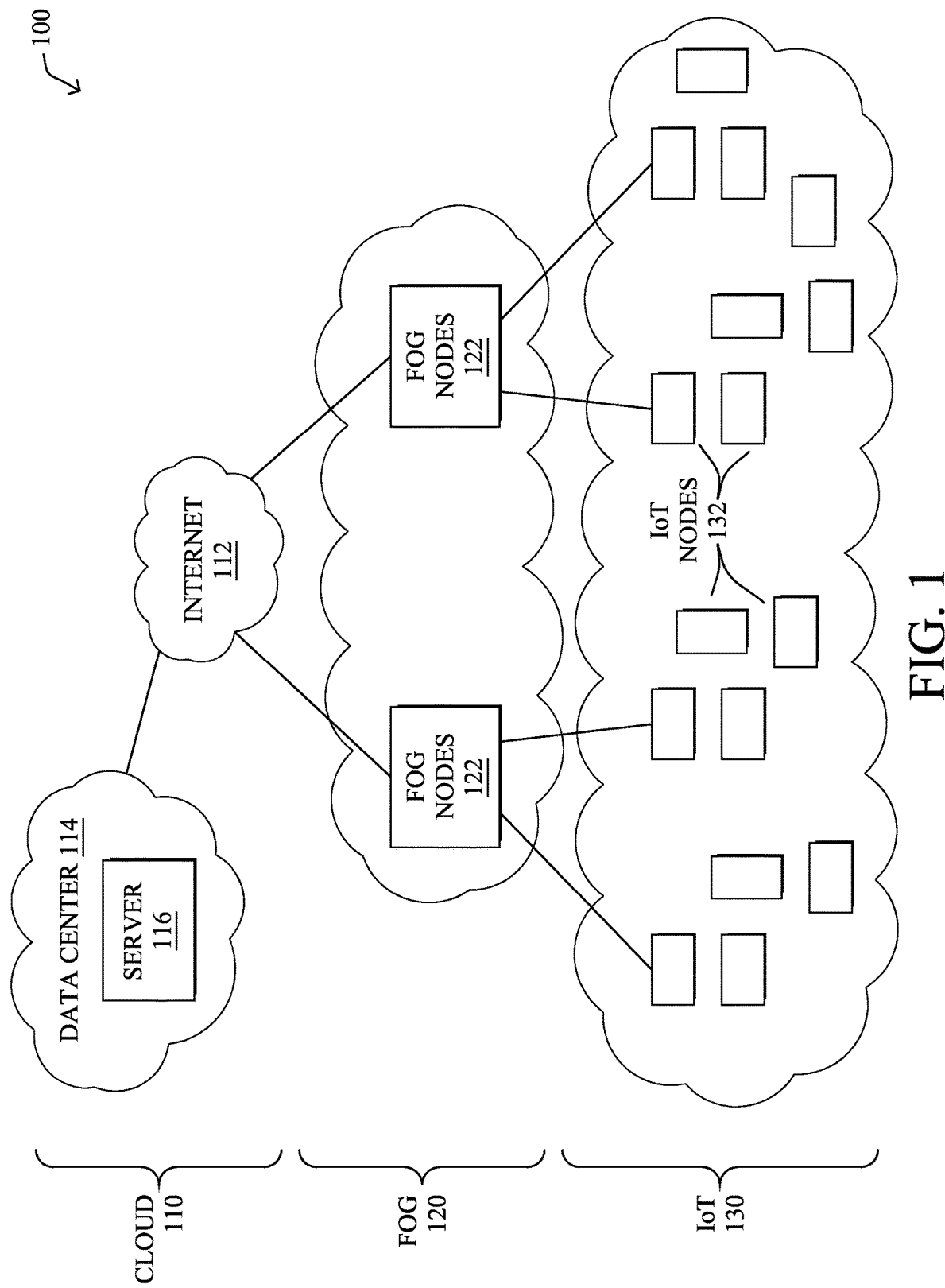
FIG. 1 illustrates an example network.

According to one or more embodiments of the disclosure, a first device in a network may obtain a satellite communication schedule indicative of when a satellite will be in communication range of the first device. The first device may communicate with the satellite according to the satellite communication schedule. The first device may receive a request for the satellite communication schedule from a second device in the network. The first device may send the satellite communication schedule to the second device, wherein the second device uses the satellite communication schedule to configure a wake schedule of the second device.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);
2) Links are generally low bandwidth, such that control plane traffic must generally be bounded and negligible compared to the low rate data traffic;
3) There are a number of use cases that require specifying a set of link and node metrics, some of them being dynamic, thus requiring specific smoothing functions to avoid routing instability, considerably draining bandwidth and energy;
4) Constraint-routing may be required by some applications, e.g., to establish routing paths that will avoid non-encrypted links, nodes running low on energy, etc.;
Scale of the networks may become very large, e.g., on the order of several thousands to millions of nodes; and
6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely cloud layer 110, fog layer 120, and IoT device layer 130. Illustratively, the cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT device layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
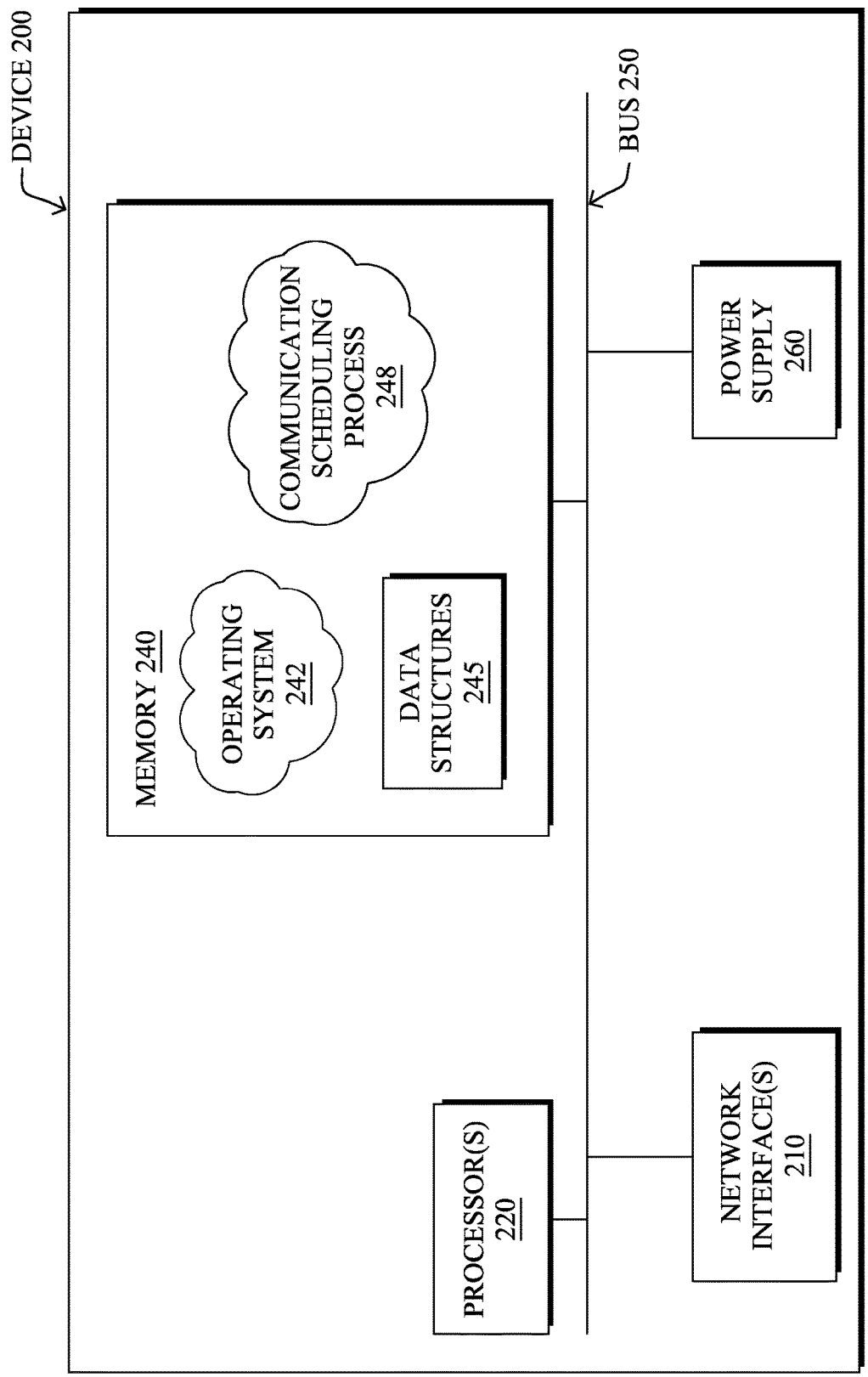
FIG. 2 illustrates an example network device/node.

FIG. 2 is a schematic block diagram of an example node/device 200 (e.g., an apparatus) that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.). In various embodiments, node/device 200 may take the form of a networking device, such as a switch, router, or the like.

Communication interface(s) 210 include the mechanical, electrical, and signaling circuitry for communicating data over a communication link. To this end, communication interface(s) 210 may be configured to transmit and/or receive data using a variety of different communication protocols, such as Ethernet, TCP/IP, UDP, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a communication scheduling process 248, as detailed below.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
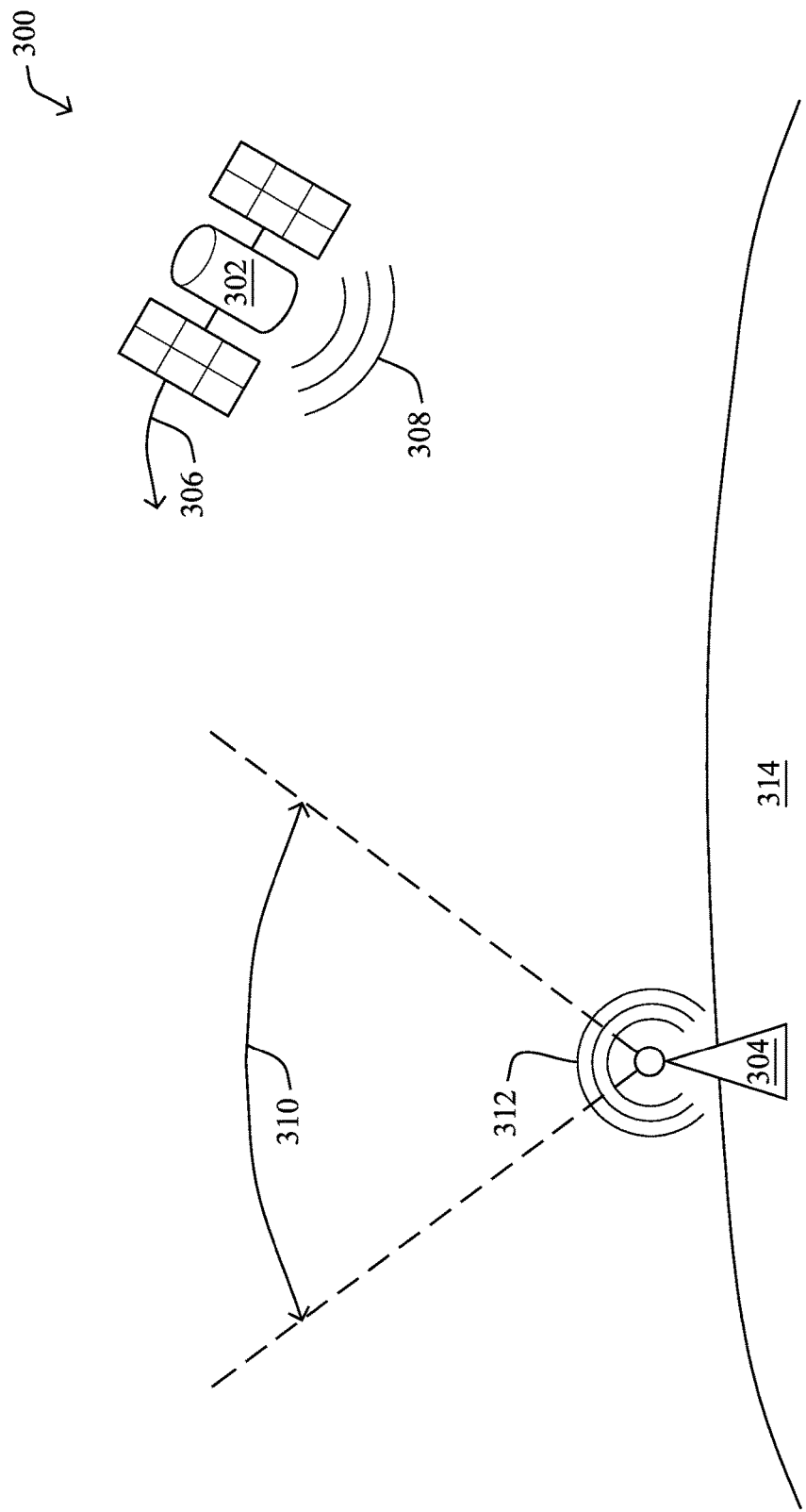
FIG. 3 illustrates an example satellite communications network.
Figure 4A:
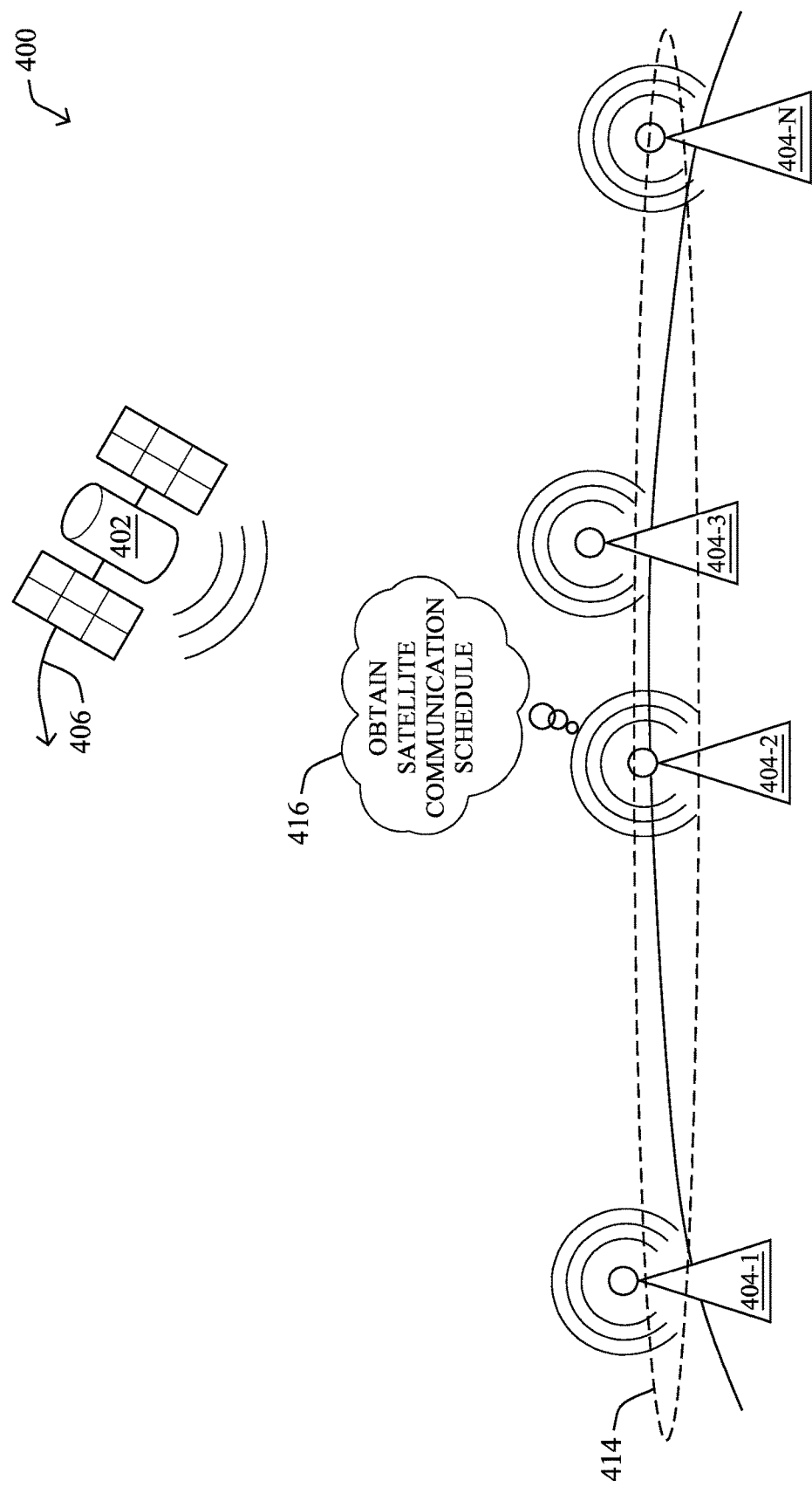
FIG. 4A-4E illustrate an example of automated configuration of device wake schedules for satellite communications in a satellite communications network.
Figure 4B:
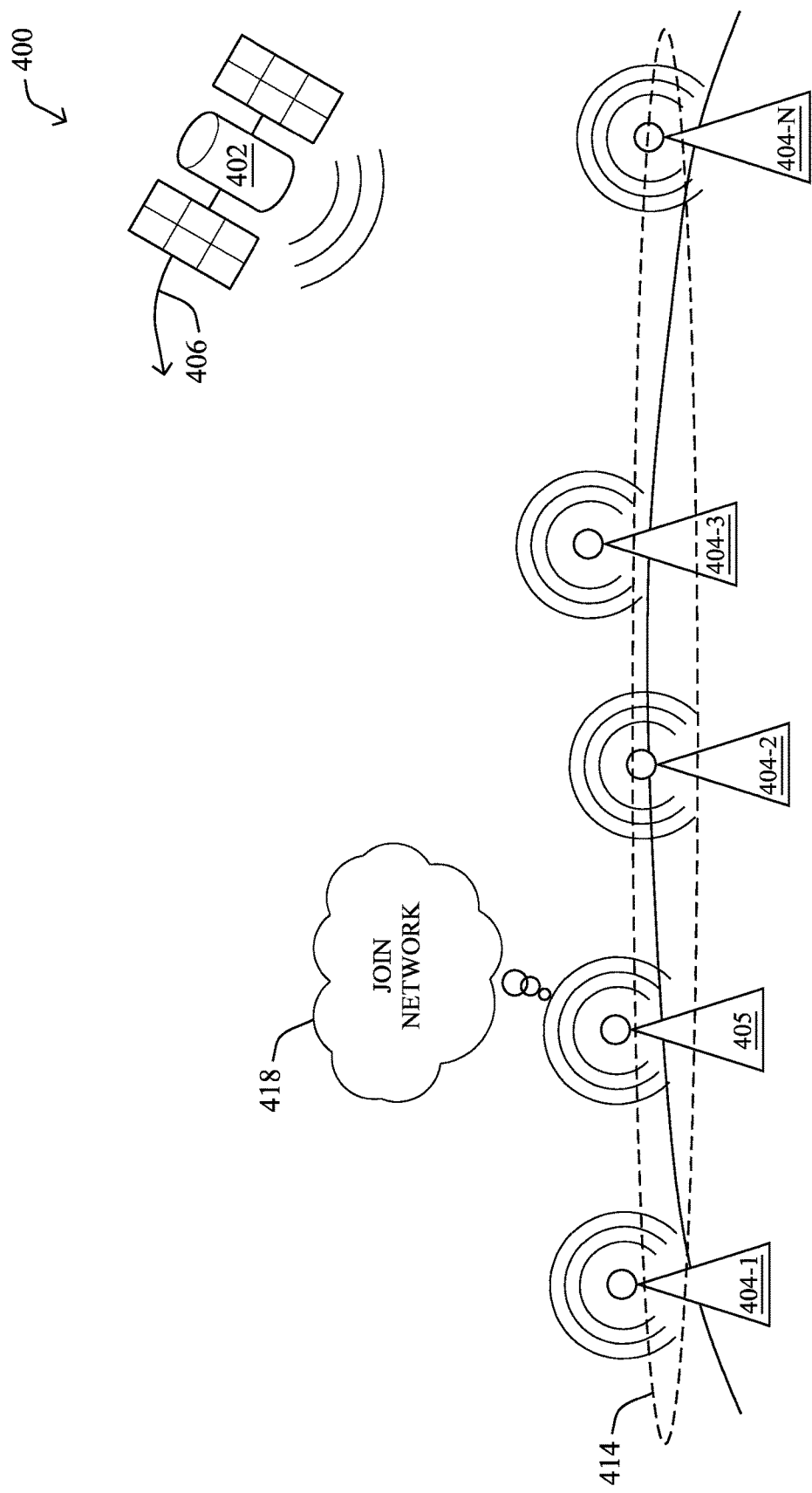
Figure 4C:
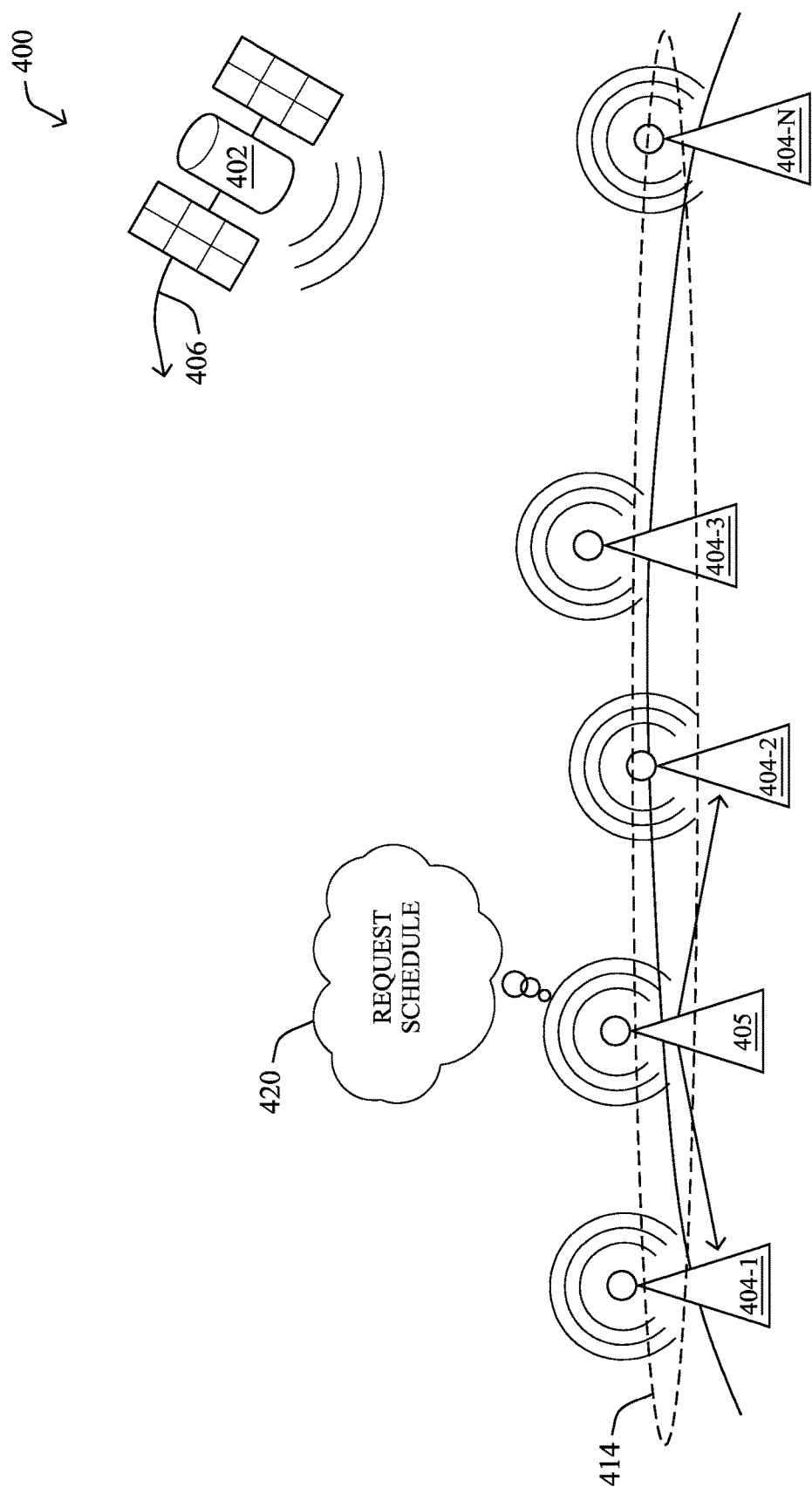
Figure 4D:
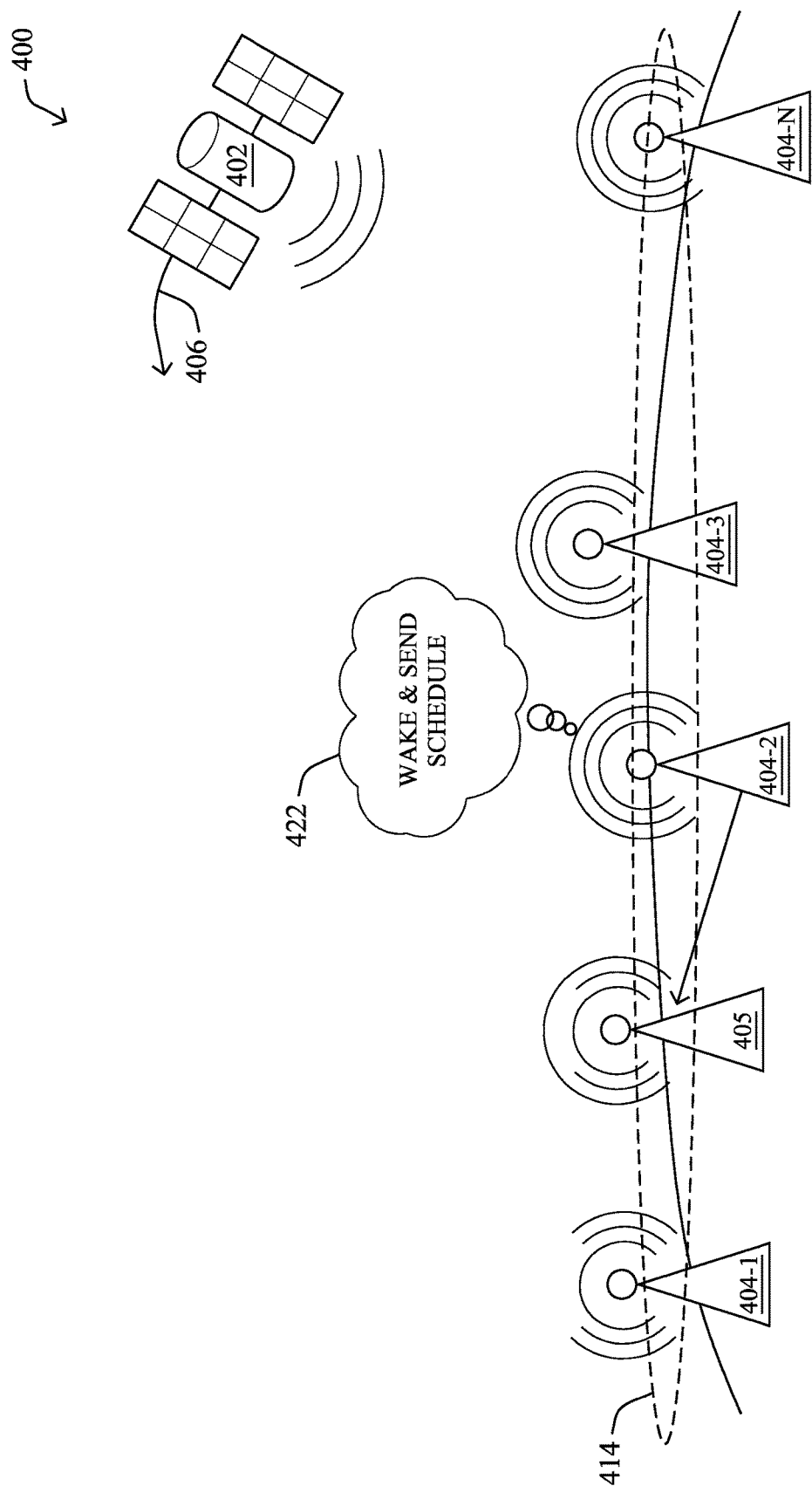
Figure 4E:
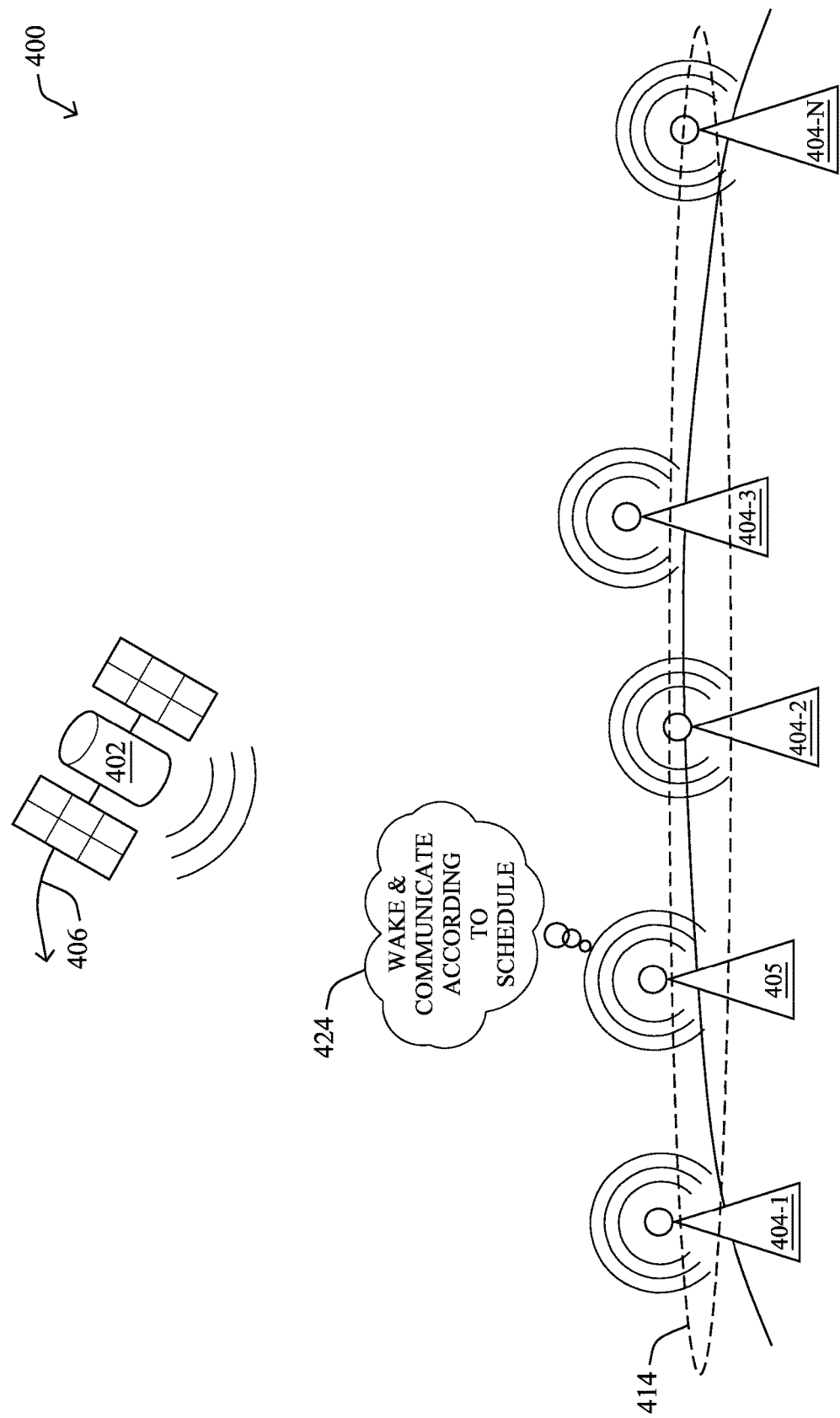

FIG. 3 is a schematic block diagram of an example of a satellite communication network 300 that may be used with one or more embodiments described herein. The satellite communication network 300 may include satellite 302. Satellite 302 may include a communications device which orbits a planet. Satellite 302 may be a single satellite and/or a constellation of satellites configured to communicate with Earth-based devices. For example, satellite 302 may include components utilizable to send a signal 308 encoded with information from satellite 302 to device 304.

In various embodiments, satellite 302 may be a low-earth orbit (LEO) satellite. As an LEO satellite, satellite 302 may orbit at an altitude less than about one-third of the radius of Earth. For example, satellite 302 may travel in an orbit less than 2,000 kilometers (Km) above the surface of the Earth (e.g., between 600 and 1200 Km above Earth, etc.). Satellite 302 may orbit at a speed of approximately 7 Km/s-8 Km/s.

Satellite 302 may complete an orbit of Earth in less than 128 minutes (e.g., approximately every 90 minutes) orbiting Earth multiple times per day (e.g., 11 or more orbits). In some specific examples, at a circular orbit altitude of 200 Km, satellite 302 may travel at 7.79 Km/s (28,000 Km/h); and at a 1,500 Km altitude, satellite 302 may travel at 7.12 Km/s (25,600 Km/h).

Satellite communication network 300 may include device 304. Device 304 may be a device configured to communicate with satellite 302. For example, device 304 may include components operable to send signals to and/or receive signals from satellite 302. Device 304 may, in some embodiments, be an IoT sensor. For example, device 304 may include components operable to collect measurements from its environment and communicate those measurements to satellite 302. Device 304 may additionally or alternatively be a communication relay for a network of sensors. For example, device 304 may include components operable to communicate with other devices, including IoT sensors, in their network (e.g., wired, wireless, etc.) and relay their sensor data to satellite 302 and/or relay signal received from satellite 302 to devices in their network. For example, device 304 may be a signal-relaying cluster head of a cluster of devices.

Device 304 may be terrestrial. For example, device 304 may be located on or near the surface of the Earth 314 and collecting data from its local environment. Satellite 302 may be traveling a particular direction 306 relative to the surface of the Earth 314 and/or relative to the position of device 304 on the Earth's surface. For example, in FIG. 3, satellite 302 is illustrated moving in a right to left direction 306 across the page and over device 304.

Satellite 302 may send signal 308 (e.g., satellite beam, etc.) encoded with information to device 304. Likewise, device 304 may send signal 312 encoded with information from to satellite 302. In order for either of these communications to be received, satellite 302 and device 304 may need to be within communication range to one another and/or to relaying devices. To be in communication range, satellite 302 and device 304 (or a relaying device) must be aligned within each other's signal path and/or signal receiving area.

In various embodiments, being within communication range may mean being within a line-of-sight (LoS) of one another. For example, when device 304 is operated it may have an LoS also known as Sky Interesting Area (SIA) 310. SIA 310 may include an area extending upward and/or outward from device 304. SIA 310 may include the area within which a signal from device 304 travels and/or within which a signal from satellite 302 may be detected and/or received. Therefore, in order for satellite 302 and device 304 to communicate with one another, satellite 302 may need to be flying overhead in a position where its signal 308 travels within SIA 310 and/or where its signal detection LoS aligns with an area where a signal 312 from device 304 is traveling (which can also be SIA 310).

At LEO satellite altitudes, only a very small portion of the Earth may be visible to satellite 302 at any given time. Further, due to the high velocity of such satellites, a location on the earth may only be within communication range of satellite 302 for a short window of time (e.g., around ten minutes) during each fly-over of the location by satellite 302. Therefore, a potential transmission window (TxW) within which the satellite 302 is in an appropriate position for sending and/or receiving signals within SIA 310 of device 304 may be relatively short and occur at various periods throughout a day (e.g., once per aligning orbit, every 90-120 minutes, etc.). That is, a potential TxW between device 304 and satellite 302 may open when satellite 302 aligns within SIA 310 during its fly-over pass and close when satellite 302 exits SIA 310.

As noted above, IoT sensors may spend most of their time sleeping, and only wake up when: (1) a critical event triggers the sensor (for example, the pressure on this pipeline has exceeded a certain threshold), or, (2) the sensor wakes up on at established frequency/schedule that is generally set by the application or by an administrator. The sensor typically stays asleep as much as possible to prolong its battery life (i.e., if the sensor were to transmit continually every time there is an event, the battery would drain quickly).

When IoT sensors are deployed where the data collection system is a LEO satellite, the satellites are only visible (e.g., aligned with an SIA of a sending/receiving device, within communication range, etc.) during flyovers, lasting approximately ten minutes per appearance. Depending on the size of the satellite constellation, a satellite may appear many times per day. If a sensor wakes up but cannot find a satellite within signal range data transmission will not be possible. Also, if the sensor were to stay awake continually, looking for the satellite to appear, it's battery would drain very quickly.

Presently, such sensors lack an ability to align their own wake-up schedules to instances when satellites are within their communication range. This results in a reduced lifespan on the sensor's battery as well as uncertainty as to whether data is correctly received by the satellite.

Adding to the complexity of the problem, a constellation of LEO satellites may fly over in a complex pattern. Depending on where the sensor has been placed on the Earth, this may make it very difficult for an administrator to know the exact and optimal sleep/wake schedule for the device that will allow it communication to a satellite. In addition, depending on how and/or where the sensors are deployed, there may be obstructions affecting different sensors at certain angles. Deployment specific obstructions may represent yet another complexity frustrating attempts to hardcode a transmission schedule by the administrator. Finally, a constellation of satellites may change composition over time as new satellites are added, providing greater coverage and better TxW opportunities for the sensors. As such, utilizing today's sensors with a satellite communication network involves a high-degree of manual configuration and reconfiguration, in-field testing in what can be remote and/or difficult to reach locations, persistent human intervention, and/or sub-optimal performance that fails to take full advantage of a sensor's capabilities.

Automated Discovery of Communication Windows for Satellites

The techniques herein introduce mechanisms to automate discovery of satellite communication windows and to manage transmissions of a population of devices with the satellite in a manner that is cognizant of the energy consumption constraints of the devices.

Illustratively, the techniques described herein may be performed by hardware, software, and/or firmware, such as in accordance with communication scheduling process 248, which may include computer executable instructions executed by the processor 220 (or independent processor of interfaces 210) to perform functions relating to the techniques described herein.

Specifically, according to various embodiments, a first device in a network may obtain a satellite communication schedule indicative of when a satellite will be in communication range of the first device. The first device may communicate with the satellite according to the satellite communication schedule. The first device may receive a request for the satellite communication schedule from a second device in the network. The first device may send the satellite communication schedule to the second device, wherein the second device uses the satellite communication schedule to configure a wake schedule of the second device.

Operationally, and according to various embodiments, a mechanism where devices automatically learn when satellites are in communication range and thus align their sleep wake schedules accordingly, is described.

For example, FIG. 4A-4E illustrates an example simplified procedure for automated configuration of device wake schedules for satellite communications in a satellite communication network 400. Satellite communication network 400 may include satellite 402 traveling in a particular direction 406. Satellite 402 may be an LEO satellite or other form of satellite, in various embodiments. In a further embodiment, satellite 402 may be a portion of a constellation of LEO satellites.

Additionally, satellite communication network 400 may include devices 404 (e.g., 404-1 . . . 404-N). Devices 404 may be sensors, such as IoT sensors (e.g., temperature sensors, humidity sensors, pressure sensors, proximity sensors, level sensors, accelerometers, gyroscopes, gas sensors, infrared sensors, optical sensors, etc.). Additionally, or alternatively, devices may be communication relays. For example, a particular device may be a relay for capturing sensor data detected by its own sensor component and/or detected by other sensor devices and communicating that data to satellite 402. In some examples, other sensors may collect sensor data by their sensing component and communicate the data to the relay device for storage and/or communication to satellite 402.

Devices 404 may be part of a device network 414, in some embodiments. Device network 414 may include a network of communicably coupled and/or individually addressable devices. Devices 404 in device network 414 may be communicably coupled in ways other than by satellite communication. For example, devices 404 within device network 414 may communication with one another utilizing wired and/or wireless communication systems (e.g., cellular communication networks, Bluetooth, Wi-Fi, Zigbee, RFID, radio, etc.). Devices 404 may be battery powered and/or have a limited source of power. Although device network 414 is illustrated as including multiple devices (e.g., 404-1 . . . 404-N), in some embodiments device network 414 may be limited is to communication couplings between only neighboring devices that are within a geographical proximity to one another (e.g., only devices within a wireless communication signal range to one another are directly communicably coupled although daisy chain communication and/or relaying may be utilized to communicate with the other devices, etc.). In various embodiments, device network 414 may be a cluster of devices.

Devices 404 may have different operating modes, in various embodiments. For example, devices 404 make have an awake mode. When in an awake mode, devices 404 may be fully operational, drawing a full allocation of power from a power source to fully operate its components, searching for signals from satellite 402, receiving signals from satellite 402, sending signals to satellite 402, communicating with other devices in device network 414, and the like. Awake mode may not involve power consumption restrictions, activity restrictions, component use restrictions, etc., which otherwise accompany a sleep mode. Sleep mode may be a mode in which devices 404 are fully or partially hibernating. In sleep mode, devices 404 may operating with reduced power consumption, disabled components, activity restrictions, and/or ceased computing functions otherwise associated with the awake state. While in sleep mode, devices 404 may be at least partially disabled. For example, in a sleep mode, devices 404 may not be searching for signals from satellite 402, receiving signals from satellite 402, sending signals to satellite 402, communicating with other devices in device network 414, etc. However, in sleep mode, devices 404 that are sensors may still be performing their sensing function.

Devices 404 may transition between the sleep mode and/or awake mode according to various triggers and/or a sleep/wake schedule. As previously mentioned, due to the short window that satellite 402 may be visible (e.g., aligned with an SIA of a sending/receiving device, within communication range, etc.) to devices 404, and the frequency of their fly-overs, the sleep/wake schedule of the devices 404 should be aligned with the windows of time that satellite 402 is within communication range so that they can be awake and performing its data communication functionalities when satellite 402 is in view. Alternatively, in examples where a device communicated to satellite 402 is through a relay device, its sleep/wake schedule should be aligned such that it has completed its data transmission to the relay before the windows of time that satellite 402 is within communication range of the relay.

When devices 404 are first deployed they may not be initially configured with a specific sleep/wake time schedule by which to communicate with satellite 402. Rather, devices 404 may be deployed with a communication schedule search/discovery functionality, utilizable to find optimal times to transmit to satellite 402 in the most efficient manner. For example, devices 404 may be equipped to execute stored instructions (e.g., communication scheduling process 248) to perform this process.

In various embodiments, to configure a sleep/wake time schedule devices 404 may initially obtain a satellite communication schedule 416. A satellite communication schedule may include a schedule of when satellite 402 will be flying overhead and/or be within communication range of a device such as within its SIA. For example, a satellite communication schedule may specify time windows (e.g., potential TxWs) when satellite 402 will be in communication range of a particular device or devices of device network 414 and, therefore, be available to participate in data transmission with the devices 404.

Devices 404 may obtain a satellite communication schedule various way. For example, devices 404 may obtain a satellite communication schedule directly from satellite 402, may learn the satellite communication schedule themselves, and/or may be taught the satellite communication schedule from a neighboring device in device network 414. Each of these mechanisms will be discussed in turn. These mechanisms may be practiced individually, sequentially, simultaneously, etc.

Obtain a Satellite Communication Schedule Directly from Satellite:

Devices may obtain a satellite communication schedule directly from satellite 402. For example, satellite 402 may be configured to periodically broadcast an orbital details table (ODT) summarizing its orbital details and/or the orbital details of any other satellites in a relevant constellation of satellites. The ODT may contain enough data to describe the position of satellite 402 and/or any others in a constellation with sufficient is accuracy to configure a wake/sleep schedule of devices 404. The ODT may be broadcast with sufficient frequency to allow devices 404 to have an up-to-date representation of satellite 402's orbit.

While the parameters of the ODT table may be tuned for specific features of the devices 404 and/or the satellite communication network 400, it may be configured with data utilizable to preview satellite passages with sufficient accuracy to establish a connection between devices 404 and satellite 402 in useful time.

As an example, we can consider the case of a LEO constellation in a 700 Km altitude shell. The satellite in such a constellation may travel at a speed of 7.5 Km/s, having a revolution period of 98.6 minutes. If we consider an SIA of a communicating device as the area within 45 degrees from the zenith, the time to traverse it passing through the zenith would be 207 seconds. In these conditions it is realistic that an accuracy of 10 kms and 1 second would be sufficient to determine when to schedule a device 404 to be awake.

The orbit of satellite 402 can be identified by latitude and the longitude of the most distant point from the equator in the north hemisphere, that is one number in the range of [0,40000] and one in the range of [0, 10000]. If an accuracy of 10 Kms is targeted, 22 bits may be sufficient to communicate this information. The speed can be determined by the height, around 700 Km altitude 1 km error leads to an error of ~1 second on the orbital period, hence 10 bits may be sufficient to communicate this information. The $4^{th}$ number for determining when satellite 402 is within communication range may be a time reference. As an example, a time reference may be used that defines the last passage to the most distant point from the equator in the Northern hemisphere. While the exact timestamp may not be needed due to the periodicity of the orbit, it may be defined as a number in the range of [0, revolution period], hence 17 bits may be sufficient to communicate this information. This example demonstrates that a small number of bytes (in this case 7) are sufficient to know the position of a satellite with sufficient accuracy.

The ODT may be broadcasted to devices 404 periodically. For example, the ODT may be broadcasted every 1-2 minutes or at any other periodicity which may produce a high probability for a device 404 to receive the ODT within the first connection with satellite 402. Of course, less frequent broadcasts may be used, and, in some examples, the broadcast may be triggered responsive to detecting devices joining and/or establishing the satellite communication network 400. Transmitting the ODT for the whole constellation may not add significant data overhead to the downstream band.

Together with the ODT, satellite 402 may transmit a reference indicator, identifying which element the current satellite itself is within a constellation of satellites. In some examples, it may be the first element by convention. Additionally, the reference indicator may include a clock reference.

In various embodiments, each device 404 may be aware of its own location. A device 404 may determine its location by utilizing GPS positioning and/or other means. Knowing its position, each device 404 may utilize this knowledge in combination with the ODT, reference indicator, and/or clock reference to calculate, in advance, when satellite 402 will be in a region where it will be possible to establish a connection (e.g., when a satellite 402 will be in a communication range such as within an SIA). Device 404 may thereby configure its wake/sleep schedule to reduce its awake period accordingly.

In some examples, devices 404 may not have access to GPS information by which to determine their location. For example, a device 404 may not be equipped with GPS functionality. In such examples, device 404's location may be determined by a learning process from signals broadcasted by satellite 402. For example, if satellite 402 transmits a clock reference together with the ODT, device 404 will have knowledge of where satellite 402 is at each ODT reception. By fitting multiple ODT receptions and their accompanying clock references from one or more satellites to a location determination model, device 404 may determine its position. Such a determination may be made at a wake-up discover mode of the device 404 and/or instigated upon joining the satellite communication network.

In addition, a device 404 may utilize a learning process to refine its SIA. For example, if satellite 402 is expected (e.g., based on calculations from the ODT, GPS position data, and/or clock reference data, etc.) to be in the SIA of device 404, but no connection is established, device 404 may record the failed connection as an event together with the expected position of satellite 402.

Such failures can be the result of many factors including a wrong positioning of satellite 402, a failure of satellite 402, a wrong positioning of device 404, a wrong time synchronization, an obsolete ODT, the presence of obstacles (e.g., building, other structures, etc.) in a LoS/SIA of satellite 402/device 404, etc. A wrong positioning of satellite 402 and/or a failure of satellite 402 may be identified as the source of a communication failure when the failure is associated with only a particular satellite or satellites. A wrong positioning of satellite 402 and/or a failure of satellite 402 may be fixed by infrastructure updating the ODT accordingly or, eventually in the absence of this fix, the satellite failing to connect may be marked as temporarily unrealizable on the device-side.

Failures resulting from a wrong positioning of device 404, a wrong time synchronization, and/or an obsolete ODT may be distinguishable as they affect all of the satellites in all the positions of a constellation of satellites. When such failures are detected, device 404 may go into a wake-up discover mode and fetch an updated ODT accordingly.

A failure resulting from the presence of an obstacle may be distinguishable because it may apply to all of the satellites in a constellation of satellites, but only in particular positions (e.g., portions of an SIA, particular geographic locations of the device, etc.). By recording these positions, device 404 can detect whether the failure was a one-off or if it is systematic. In some examples, resolving that the failure was not a one-off and/or is systematic may cause device 404 to reduce its effective SIA. This, of course, may lead to a reconfiguration of a sleep/wake schedule of device 404 allowing device to stay sleeping while satellite 402 is in the obstructed portion of its SIA.

Utilizing this mechanism may speed up the initial setup of devices 404. When a is device 404 doesn't have an ODT, or the ODT is expired, or the ODT is proven to be inaccurate (e.g., one or more expected satellite passages are missed and/or result in communication failures), the device 404 may transition into a wake-up discover mode. Device 404 may wake up and/or stay awake for a limited amount of time searching for a signal from satellite 402 (e.g., a few seconds, etc.). If a signal is detected, device 404 may stay awake until either satellite 402 broadcasts the ODT, or the satellite connection is lost; if no satellite is detected or if no successful ODT is received, then device 404 may transition back to the sleeping mode. Once ODT is received by device 404, it may be able to preview the passages of satellite 402 in the SIA and may not be required to be awake in order to determine firsthand when satellite 402 will be/is in communication range. In cases of non-urgent message, or of dense enough constellations of satellites, device 404 may utilize the ODT to wake up and transmit and/or receive only when satellite 402 is in an optimal portion of its SIA such as around the zenith. Waking only when satellite 402 is in the optimal portion of the SIA may tighten up the TxW and reduce collisions between multiple transmitting devices.

Self-Learning of Satellite Communication Schedule:

In some examples, devices 404 may be configured to learn the satellite communication schedule firsthand. While the following example is given in the context of an initial deployment of a device 404, additional embodiments are contemplated where a same or similar procedure is followed when a device 404 has recovered from an error, recovered from a power loss, re-joined a network, determined that its ODT and/or existing configuration is obsolete, etc.

In an initial state (e.g., when first deployed, etc.), a default sleep/awake mode (e.g., wake-up discover mode) periodicity may be configured for the device 404. This default periodicity may not be intended and/or utilized for regular sensor data communication with the satellite communication network 400 throughout its normal operation but may instead be intended for and/or utilized during an initial configuration and/or reconfiguration bootstrapping period for device 404 to be utilized as a starting point for a satellite communication schedule learning algorithm. For example, in this is boot strapping period, device 404 may wake up for a pre-defined amount of time (e.g., a few seconds, tens of seconds, etc.) to determine if a signal from a satellite (e.g., satellite 402) is detected. If a signal is detected, this may indicate that satellite 402 in the SIA of device 404. However, if no signal is detected, this may indicate that satellite 402 is not within the SIA of device 404 and/or device 404 may transition back to sleep mode. After some amount of time (e.g., a pseudo-random amount of time bounded by a maximum period expected between satellite 402 flyovers), device 404 may wake up and attempt to establish contact with satellite 402 once again.

Each time that device 404 wakes up it may record whether successful contact (e.g., satellite signal was detected during wake period) was made with satellite 402 and/or which satellite the contact was made with. Device 404 may continue on within this signal discover scheme using a pseudo-random wake-up timer over a period of time (e.g., a few days, etc.) until at least a first successful contact with satellite 402 has been made. In examples where an ODT is communicated to device 404 from satellite 402, as previously described, the first successful contact may provide sufficient data to learn the fly-over periodicity of satellite 402 and/or any other satellites in the constellation. However, in examples where no ODT is communicated at first successful contact, device 404 may continue to learn the fly-over periodicity of satellite 402 by iterating through the signal discovery scheme.

If there are multiple satellites in a constellation, device 404 may continue performing the signal discovery scheme until it has learned the fly-over periodicity of all the satellites in the constellation. The device 404 may determine there are multiple satellites in a constellation through data collected in executing the signal discovery scheme, by being preconfigured with knowledge of a multiple satellite constellation, by receiving an indication during at least the first successful contact with satellite 402 that it is a member of a multiple satellite constellation, etc.

As flyover periods are learned, device 404 may perform calculations on the successful contact periods to predict future fly-over times for satellite 402. If after a threshold amount of time and/or awake cycles, no satellite is discovered, device 404 may is alter its awake/sleep schedule to become more aggressive in its waking period (e.g., spending longer amounts of time awake) and/or may increase the frequency of discover wake times. In some examples, after passage of a threshold amount of time and/or awake cycles no satellite is discovered, device 404 may transition to attempting to learn the satellite communication schedule from a neighboring device as described in greater detail below. Once all the flyover periods have been learned, the wake-up discover mode and/or the satellite communication schedule learning phase may be considered complete, and the signal discovery process may be ceased by device 404.

Once device 404 has established communication with satellite 402 during one of its discovery phase awake periods, it may remain awake until satellite 402 passes out of communication range (e.g., the signal from satellite 402 is no longer detected in the SIA of device 404). By doing so, device 404 may learn a potential TxW (e.g., communication window) for satellite 402. Device 404 may make a record of this interaction, establishing the time window as a known communication window with satellite 402. In various embodiments, satellite 402 may communicate its position and/or speed to device 404. This data may additionally be used to calculate a fly-over period of satellite 402. In some examples, this data may be utilized to calculate and entire satellite communication schedule of satellite 402 without iterating through each potential TxW.

Satellite 402 may fly over the SIA of device 404 in a predictable pattern and the number of fly-overs may be well established beforehand, depending on the satellite constellation size. As more satellite fly-over periods are learned, device 404 may begin to dynamically build a satellite communication schedule of when satellites are likely to appear. The satellite communication schedule may also be augmented by an administrator of satellite communication network 400, dictating how many fly-overs per day should be expected (allowing the device 404 to "fill in the gaps" when it should wake up), and how many satellites are in the constellation.

Over time, orbital adjustments may be made to satellites. Thus, during each flyover, device 404 may monitor how long satellite 402 is in communication range (e.g., is within LoS/SIA). As this changes slightly due to any orbital corrections, device 404 is may skew its satellite communication schedule accordingly.

During a predicted fly-over time, device 404 may wake up, establish communication with satellite 402, and begin transmitting data. Meanwhile, device 404 may continuously note of the duration of the established communication. As new fly-over periods are learned, device 404 may also begin waking up fractionally earlier for future fly-overs, in an effort to learn the beginning of the communications window, until the extremities of the potential TxW are learned.

As satellite 402's fly-over periods are learned, device 404 may configure its wake/sleep schedule to temporally align its wake periods with the fly-over periods. Device 404 may configure its wake/sleep schedule so that during other periods (e.g., non-fly-over periods) the device will transition to sleep mode. Once an accurate and/or compressive satellite communication schedule has been established for its SIA, device 404 may conclude the discovery phase and simply follow the established communication pattern waking and transmitting within a determined communication window and sleeping outside of those communication windows.

Learning the Satellite Communication Schedule from a Neighboring Device:

In various embodiments, a device may learn the satellite communication schedule from a neighboring device. The neighboring device may have obtained the satellite communication schedule through a variety of processes. For example, the neighboring device may have learned the satellite communication schedule from an administrator, learned the satellite communication schedule from its neighboring device, self-learned the satellite communication schedule through the above-described signal discovery scheme, obtained the satellite communication schedule directly from the satellite as an ODT, etc.

In various circumstances, a device 405 may be added and/or re-added to an area including existing devices (e.g., devices 404). Device 405 may be the same type of device as the existing devices, or it may be a different type of device. In various examples, device 405 may be an IoT sensor and/or a satellite communications relay device. As previously described, existing devices may be part of device network 414. Existing devices may utilize device network 414 to communicate with one another.

Device 405 may, at 418, join device network 414. Device 405 may be joining the device network 414 for the first time and/or rejoining the device network 414 after having lost its previous connection and/or any configurations.

Device 405 may join device network 414 utilizing a variety of network joining and/or authentication protocols. In joining device network 414, device 405 may become communicatively coupled to one or more existing device over device network 414. For example, device 405 may communicatively couple itself to the entire device network 414 including all the existing devices (e.g., 404-1 ... 404-N) connected thereto. In some examples, device 405 may communicatively couple itself to a lesser portion of the existing devices coupled to the device network 414. For example, device 405 may communicatively couple itself only to neighboring existing devices (e.g., 404-1 and 404-2), which may be defined by their network structure proximity, geographic proximity, residing in range of a wireless signal from device 405, etc.

Upon joining device network 414, device 405 may, at 420, request a satellite communication schedule for satellite 402 and/or any other satellites in a constellation of satellites used by the existing devices. Specifically, device 405 may advertise this request to the existing devices. Depending on the configuration of device network 414, the request may be broadcasted a variety of ways such that it reaches all networked existing devices (e.g., 404-1 ... 404-N) or only a portion of networked existing devices such as those neighboring existing devices located nearby (e.g., 404-1 and 404-2), etc.

Device 405 may issue the request as an assistance required broadcast on a reserved frequency of device network 414. The broadcast may be a low-power transmission that excites and/or elicits a response from nearby and/or neighboring existing devices (e.g., 404-1 and/or 404-2). The broadcast may be limited, at least at first, to exciting only nearby neighboring devices within a predefined geographic proximity and/or network structure proximity. However, the broadcast may be broadcasted from device 405 with an increased signal strength and/or relayed to is additional existing devices (e.g., 404-3 and 404-N) when, for example, the neighboring existing devices (e.g., 404-1 and/or 404-2) are unable to share a satellite communication schedule.

When a particular existing device (e.g., 404-2) receives the broadcast from device 405, it may, at 422, trigger the particular existing device (e.g., 404-2) to wake up from a sleep state and send back the requested satellite communication schedule. That is to say that existing devices may not need to be in an awake state in order to receive the broadcast from device 405. Instead, existing devices may be able to passively receive the broadcast and transition to an awake state responsive thereto. Once in the awake state, the particular existing device that received the broadcast may respond back with a broadcast of its own, providing its known satellite communication schedule (e.g., that it has obtained and/or stored) to device 405.

In some examples, the known satellite communication schedule may be a portion of a satellite communication schedule and/or may be particular to the location of the existing device that obtained it. In additional examples, the particular existing device may, in the event that it does not possess a known satellite communication schedule, not respond to the broadcast, respond with a broadcast indicating it does not have the schedule, and/or relay the request for assistance broadcast to its nearby neighboring devices for resolution. After the particular existing device has sent back its response broadcast, it may return to a sleep state to await its next TxW.

Upon receiving the satellite communication schedule from an existing device, device 405 may, at 424, wake and communicate according to the schedule. For example, device 405 may configure its wake/sleep schedule to align with fly-overs of satellite 402, the fly-over times being determined from the received satellite communication schedule. For example, device 405 may configure itself to transition to an awake state while satellite 402 is in communication range and/or begin transmitting data to and/or receiving data from satellite 402 while operating in this awake state.

In some examples, device 405 may configure its wake/sleep schedule to precede or follow fly-overs of satellite 402 as determined from the received satellite is communication schedule. For example, where device 405 communicates its data to an existing device that is a relay device which communicates with satellite 402 during a fly-over period, device 405 may configure itself to send the data it wishes to be sent to satellite 402 to the relay device prior to the fly-over period. The data may be stored at the relay device and/or forwarded to satellite 402 from the relay device during the fly-over period.

In addition, device 405 may incorporate satellite communication schedules received from multiple existing devices, other newly added devices, and/or its own observations made through, for example, a signal discovery scheme to calculate a satellite communication schedule tailored to its location. For example, if many new devices are deployed together, and none of them know the constellation fly-over schedule for a satellite communications network, they can work as a collective to learn the satellite communication schedule. For example, the described learn-and-broadcast process may be utilized by the newly added devices to advertise periods that are learned among them until all the periods have been discovered, at which time the discovery phase may be concluded.

In various embodiments, not all devices in a device network 414 will have the exact same TxW. For example, due to the unique physical location of each device, possible obstructions, antennae angles, etc., each device may have a different and/or unique SIA with different properties in different orientations resulting in different potential TxWs. Thus, each device accepting all or part of a satellite communication schedule from another device may use this data to tune itself and/or to determine if a TxW is workable for its specific configuration. Overtime, each device may create and/or validate its own unique wake/sleep schedule and/or satellite communication schedule based on these inputs. For example, a particular device may use a received satellite communication schedule as a starting framework for identifying potential TxWs and/or configuring its wake/sleep schedule but may additionally validate the framework using its own measurements and/or performing experimental measurements of the framework on its own to identify potential TxW modifications and/or potential new TxWs.

As described above, one or more of device 405 and/or the existing devices may be a relay device. In such instances, the relay device may perform the discovery and/or learning function on behalf of non-relay devices in the device network 414 when satellite 402 passes overhead. As a relay device learns the fly-over pattern, it may communicate down to the other devices (e.g., non-relay devices, other relay devices, etc.), establishing a sleep/wake schedule.

In providing devices in device network 414 with the described mechanism to automatically discover satellite communication schedules and/or to automatically configure their transmission schedules, the potential exists for multiple devices resolving a same TxW resulting in potential data traffic collisions. Such collections may spawn failed communications and/or system errors. As such, a data traffic control strategy may be implemented for the satellite communication network 400.

For example, where an amount of data traffic exceeding a predefined threshold associated with causing data traffic collisions between the data from multiple devices is predicted and/or detected, the devices in device network 414 may temporally spread out their data transmissions in a manner that reduces the change of such collisions. For example, when satellite 402 and a device have a potential communication window (e.g., a window of time when satellite 402 is in communication range of the device, such as within the SIA of the device), the satellite 402 may transmit a flag signal requesting that the device stagger any of its data transmissions by a random amount of time (e.g., by the statistic of a random number generator which may be broadcasted by satellite 402 as part of the flag signal). In this manner, randomized delays my be applied to an effective coverage time (e.g., randomized across the window of time that satellite 402 is in communication range) rather than across real time. In this manner, expiration of a non-transmission window of multiple devices during a no-coverage period and a simultaneous transition of those multiple devices to a wake period and/or transmission attempt upon the first satellite passage, which would suddenly overwhelming the communication capacity of satellite 402, is prevented. Specifically, the random postponement of the is transmission sent by satellite 402 may be bound by the limits of the communications window between the device and satellite 402 specified within the satellite communication schedule (e.g., postponed so as to still be in the communication window).

Figure 5:
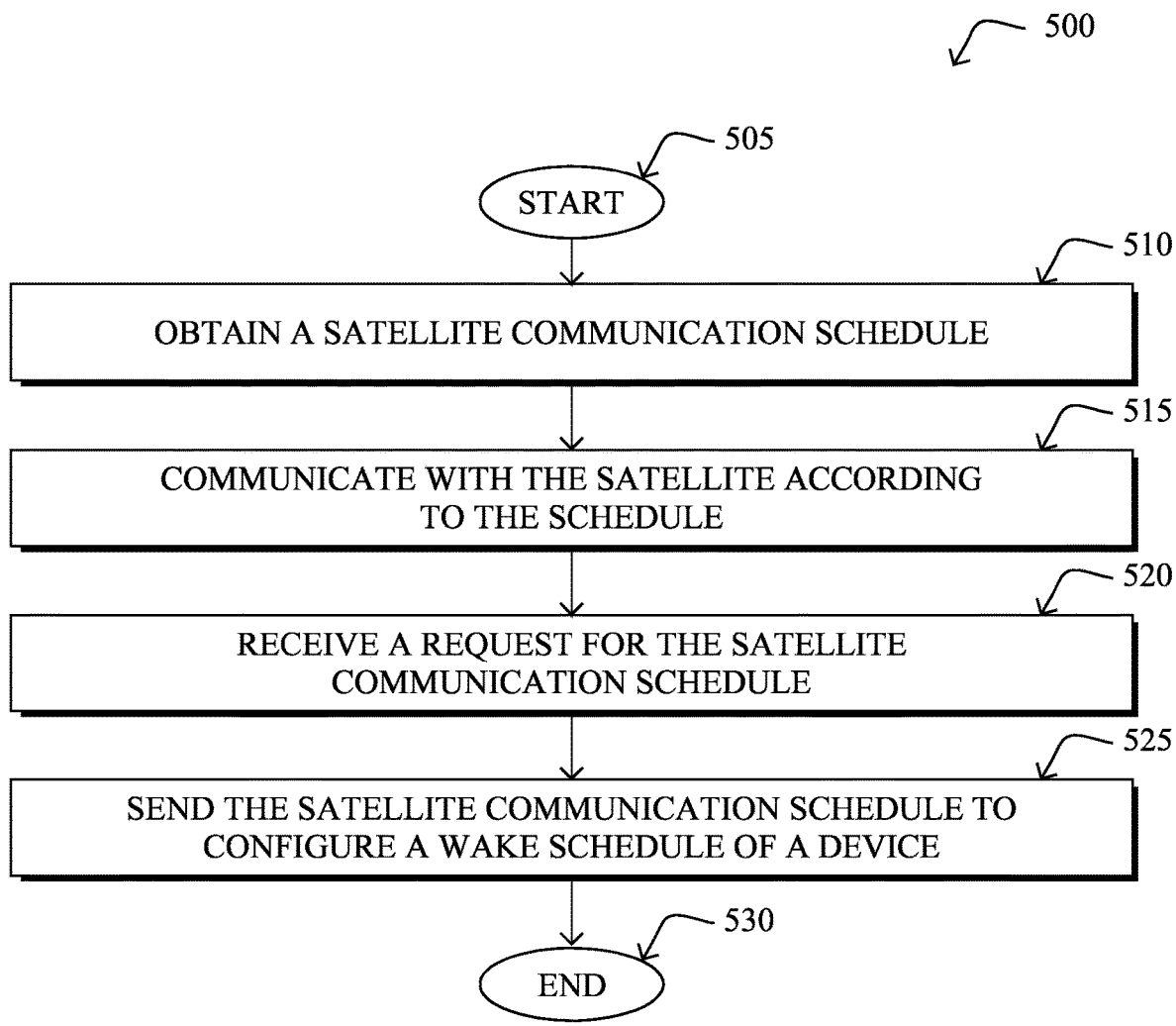
FIG. 5 illustrates an example simplified procedure for automated configuration of device wake schedules for satellite communications.

FIG. 5 illustrates an example simplified procedure (e.g., a method) for automated configuration of device wake schedules for satellite communications, in accordance with one or more embodiments described herein. For example, a non-generic, specifically configured device (e.g., device 200), may perform procedure 500 by executing stored instructions (e.g., communication scheduling process 248). The procedure 500 may start at step 505, and continues to step 510, where, as described in greater detail above, a first device in a network may obtain a satellite communication schedule. The satellite communication schedule may be indicative of when a satellite will be in a communication range of the first device. Obtaining the satellite communication schedule may include receiving, at the first device, an ODT from the satellite. The ODT may be indicative of a fly-over schedule of the satellite. The satellite may be a low-earth orbit satellite.

At step 515, as detailed above, the first device may communicate with the satellite according to the satellite communication schedule. For example, communicating with the satellite according to the satellite communication schedule may include sending, by the first device and to the satellite, sensor data captured by the first device (e.g., directly from a sensor component of the first device, from a sensor component of another device, etc.). In addition, the first device may transition from a sleep state to a wake state based on the satellite communication schedule.

At step 520, as detailed above, the first device may receive a request for the satellite communication schedule from a second device in the network. The request may be sent over a reserved frequency of the network. The request may be broadcast in the network by the second device.

At step 525, where, as detailed above, the first device may send the satellite communication schedule to the second device. The second device may use the satellite communication schedule to configure a wake schedule of the second device. For example, the second device may configure its wake schedule to communicate with the satellite based in part on the satellite communication schedule and based in part on a location of the second device. The second device may communicate with the satellite according to the wake schedule of the second device. In some examples, the first device may be a relay device. For example, the first device may receive, during a wake period of the wake schedule of the second device, a message from the second device to be relayed by the first device to the satellite. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a no/low-touch device integration into a satellite communication network. Devices may be configured to automatically obtain and/or share satellite communication schedules without involving manual in-field configuration and/or suboptimal pre-launch configurations that amount to little more than guesses about the deployment conditions of a device. Further, these techniques allow for each device to configure its communications with a satellite in a manner that is customized to its individual properties, geographic location, environmental influences, etc. Furthermore, these techniques provide a knowledge sharing mechanism among devices to achieve this customization without the device having to consume large amounts of a power supply to relearn, through repeated power consuming signal testing, portions of the schedule, which are already possessed by other devices.

Moreover, the techniques provide for automated adaption of devices to changes in a satellite communication network. For example, as satellites are added to a constellation, the environment around a device is altered (e.g., modification of obstructions, etc.), orbital drift occurs, new devices are added to a network, etc. these techniques may be implemented to automatically recognize and adapt the functionality of is the device to the changes without manual intervention.

While there have been shown and described illustrative embodiments that provide automated configuration of device wake schedules for satellite communications, it is to be understood that various other adaptations and modifications may be made within the spirit and scope of the embodiments herein. For example, while certain embodiments are described herein with respect to using the techniques herein for certain purposes, the techniques herein may be applicable to any number of other use cases, as well. In addition, while certain types of devices and/or communication window discovery mechanisms are discussed herein, the techniques herein may be used in conjunction with any devices and/or communication window discovery mechanisms.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    obtaining, by a first device in a network, a satellite communication schedule indicative of when a satellite will be in communication range of the first device;
    communicating, by the first device, with the satellite according to the satellite communication schedule;
    receiving, at the first device, a request for the satellite communication schedule from a second device in the network; and
    sending, by the first device, the satellite communication schedule to the second device, wherein the second device uses the satellite communication schedule to configure a wake schedule of the second device to communicate with the satellite based in part on the satellite communication schedule.

2. The method as in claim 1, wherein the request is sent over a reserved frequency of the network.

3. The method as in claim 1, wherein the second device further configures its wake schedule to communicate with the satellite based in part on a location of the second device.

4. The method as in claim 1, wherein obtaining the satellite communication schedule comprises:
    receiving, at the first device, an Orbital Details Table from the satellite that is indicative of a fly-over schedule of the satellite.

5. The method as in claim 1, further comprising:
    receiving, at the first device and during a wake period of the wake schedule of the second device, a message from the second device to be relayed by the first device to the satellite.

6. The method as in claim 1, further comprising:
transitioning, by the first device, from a sleep state to a wake state based on the satellite communication schedule.

7. The method as in claim 1, wherein the request is broadcast in the network by the second device.

8. The method as in claim 1, wherein communicating with the satellite according to the satellite communication schedule comprises:
sending, by the first device and to the satellite, sensor data captured by the first device.

9. The method as in claim 1, wherein the second device communicates with the satellite according to the wake schedule of the second device.

10. The method as in claim 1, wherein the satellite is a low-earth orbit satellite.

11. An apparatus, comprising:
one or more network interfaces;
a processor coupled to the one or more network interfaces and configured to execute one or more processes; and
a memory configured to store a process that is executable by the processor, the process when executed configured to:
obtain a satellite communication schedule indicative of when a satellite will be in communication range of the apparatus in a network;
communicate with the satellite according to the satellite communication schedule;
receive a request for the satellite communication schedule from a device in the network; and
send the satellite communication schedule to the device, wherein the device uses the satellite communication schedule to configure a wake schedule of the device to communicate with the satellite based in part on the satellite communication schedule.

12. The apparatus as in claim 11, wherein the request is sent over a reserved frequency of the network.

13. The apparatus as in claim 11, wherein the device further configures its wake schedule to communicate with the satellite based in part on a location of the device.

14. The apparatus as in claim 11, wherein the process when executed is further configured to:
obtain the satellite communication schedule by receiving an Orbital Details Table from the satellite that is indicative of a fly-over schedule of the satellite.

15. The apparatus as in claim 11, wherein the process when executed is further configured to:
receive, during a wake period of the wake schedule of the device, a message from the device to be relayed by the apparatus to the satellite.

16. The apparatus as in claim 11, wherein the process when executed is further configured to:
transition the apparatus from a sleep state to a wake state based on the satellite communication schedule.

17. The apparatus as in claim 11, wherein the request is broadcast in the network by the device.

18. The apparatus as in claim 11, wherein the process when executed is further configured to:
send, to the satellite, sensor data captured by the apparatus.

19. The apparatus as in claim 11, wherein the device communicates with the satellite according to the wake schedule of the device.

20. A tangible, non-transitory, computer-readable medium storing program instructions that cause a first device in a network to execute a process comprising:
obtaining, by the first device, a satellite communication schedule indicative of when a satellite will be in communication range of the first device;
communicating, by the first device, with the satellite according to the satellite communication schedule;
receiving, at the first device, a request for the satellite communication schedule from a second device in the network; and
sending, by the first device, the satellite communication schedule to the second device, wherein the second device uses the satellite communication schedule to configure a wake schedule of the second device to communicate with the satellite based in part on the satellite communication schedule.

* * * * *